US012522202B2

United States Patent
Sharma et al.

(10) Patent No.: US 12,522,202 B2
(45) Date of Patent: Jan. 13, 2026

(54) ADAPTIVE VEHICLE OCCUPANT DETECTION AND MONITORING

(71) Applicant: GM Global Technology Operations LLC, Detroit, MI (US)

(72) Inventors: Manoj Kumar Sharma, Troy, MI (US); Akilesh Rajavenkatanarayanan, Macomb, MI (US); Mohammad Naserian, Windsor (CA); Maureen Elizabeth August, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 18/618,033

(22) Filed: Mar. 27, 2024

(65) Prior Publication Data

US 2025/0304034 A1  Oct. 2, 2025

(51) Int. Cl.
*B60W 30/02* (2012.01)
*B60L 58/12* (2019.01)
*B60W 50/14* (2020.01)
*A61B 5/00* (2006.01)
*A61B 5/08* (2006.01)

(52) U.S. Cl.
CPC ........... *B60W 30/025* (2013.01); *B60L 58/12* (2019.02); *B60W 50/14* (2013.01); *A61B 5/0816* (2013.01); *A61B 5/6893* (2013.01); *B60W 2420/403* (2013.01); *B60W 2540/221* (2020.02)

(58) Field of Classification Search
CPC .................................................... B60W 30/025
See application file for complete search history.

(56) References Cited

U.S. PATENT DOCUMENTS 9,764,688 B2  9/2017  Biondo et al.
10,349,891 B2  7/2019  Johnson et al.
(Continued)

FOREIGN PATENT DOCUMENTS

DE  102009061016 A1  3/2011
EP        3407318 A1  11/2018

OTHER PUBLICATIONS

United States Patent and Trademark Office. U.S. Appl. No. 18/497,417, filed Oct. 30, 2023.
(Continued)

*Primary Examiner* — Michael A Berns
(74) *Attorney, Agent, or Firm* — Vivacqua Crane, PLLC

(57) ABSTRACT

A method for increasing occupant comfort and safety in a vehicle may include detecting an occupant in the vehicle using one or more of a plurality of occupant monitoring sensors. The method further may include determining an occupant comfort and safety level of the occupant in the vehicle using the one or more of the plurality of occupant monitoring sensors in response to detecting the occupant in the vehicle. The occupant comfort and safety level includes one of: a high comfort and safety level and a low comfort and safety level. The method further may include performing a monitoring action in response to determining that the occupant comfort and safety level is the high comfort and safety level. The method further may include performing a corrective action in response to determining that the occupant comfort and safety level is the low comfort and safety level.

20 Claims, 3 Drawing Sheets

(56) References Cited

U.S. PATENT DOCUMENTS

| | | |
|---|---|---|
| 11,299,013 B2 | 4/2022 | Chang et al. |
| 12,134,388 B2 * | 11/2024 | Barcia ................ A61B 5/021 |
| 2025/0136031 A1 * | 5/2025 | Rajavenkatanarayanan ............... B60R 21/01538 |

OTHER PUBLICATIONS

Sharma, M., et al. U.S. Appl. No. 18/497,417, filed Oct. 30, 2023.

* cited by examiner

ADAPTIVE VEHICLE OCCUPANT DETECTION AND MONITORING

INTRODUCTION

The present disclosure relates to systems and methods for occupant detection for a vehicle, and more particularly, to detecting, monitoring, and maintaining the comfort and safety of unattended occupants in a vehicle.

To increase occupant awareness, comfort, and safety, vehicles may be equipped with occupant detection systems which are configured to detect occupants within the vehicle. Occupant detection systems may use sensors such as seat weight sensors, seat belt sensors, and/or the like to detect occupants within the vehicle. When occupants are detected in the vehicle, vehicle systems may be adapted to optimize performance based on occupant characteristics such as occupant seating location and occupant weight. For example, activation of safety restraint systems may be adjusted based on occupant characteristics. In another example, the occupant detection system may be used to inform a driver about unattended occupants or occupants left behind in the vehicle. However, current occupant detection systems may not have the capability to monitor a comfort and safety level of unattended occupants. Furthermore, current occupant detection systems may not have the capability to adaptively adjust vehicle systems to increase the comfort and safety level of unattended occupants.

Thus, while current occupant detection systems and methods achieve their intended purpose, there is a need for a new and improved system and method for detecting, monitoring, and increasing the comfort and safety of unattended occupants in a vehicle.

SUMMARY

According to several aspects, a method for increasing occupant comfort and safety in a vehicle is provided. The method may include determining a vehicle location of the vehicle using a global navigation satellite system (GNSS). The method further may include comparing the vehicle location to a list of previously visited locations. The method further may include initiating a detection routine in response to determining that the vehicle location is contained in the list of previously visited locations, the detection routine may include detecting an occupant in the vehicle using one or more of a plurality of occupant monitoring sensors. The detection routine further may include determining an occupant comfort and safety level of the occupant in the vehicle using the one or more of the plurality of occupant monitoring sensors in response to detecting the occupant in the vehicle. The occupant comfort and safety level includes one of: a high comfort and safety level and a low comfort and safety level. The detection routine further may include performing a monitoring action in response to determining that the occupant comfort and safety level is the high comfort and safety level. The detection routine further may include performing a corrective action in response to determining that the occupant comfort and safety level is the low comfort and safety level.

In another aspect of the present disclosure, the method further may include detecting a manual activation of the detection routine. The method further may include determining the vehicle location using the GNSS in response to detecting the manual activation of the detection routine. The method further may include adding the vehicle location to the list of previously visited locations.

In another aspect of the present disclosure, detecting the occupant in the vehicle further may include performing a detection measurement using one or more of the plurality of occupant monitoring sensors. The plurality of occupant monitoring sensors includes at least one of: a vehicle seat occupancy detection system and a vehicle interior camera. Detecting the occupant in the vehicle further may include identifying the occupant in the vehicle based at least in part on the detection measurement.

In another aspect of the present disclosure, determining the occupant comfort and safety level further may include performing a vehicle interior temperature measurement using one or more of the plurality of occupant monitoring sensors. The plurality of occupant monitoring sensors includes at least a vehicle interior temperature sensor. Determining the occupant comfort and safety level further may include comparing the vehicle interior temperature measurement to a predetermined temperature threshold. Determining the occupant comfort and safety level further may include determining the occupant comfort and safety level to be the high comfort and safety level in response to determining that the vehicle interior temperature measurement is less than or equal to the predetermined temperature threshold. Determining the occupant comfort and safety level further may include determining the occupant comfort and safety level to be the low comfort and safety level in response to determining that the vehicle interior temperature measurement is greater than the predetermined temperature threshold.

In another aspect of the present disclosure, determining the occupant comfort and safety level further may include performing an occupant biometric measurement using one or more of the plurality of occupant monitoring sensors. The plurality of occupant monitoring sensors further includes at least a biometric sensor. Determining the occupant comfort and safety level further may include determining the occupant comfort and safety level based at least in part on the occupant biometric measurement.

In another aspect of the present disclosure, determining the occupant comfort and safety level further may include performing an occupant reaction measurement using one or more of the plurality of occupant monitoring sensors. The plurality of occupant monitoring sensors further includes at least one of: a vehicle interior microphone and a vehicle interior camera. Determining the occupant comfort and safety level further may include determining the occupant comfort and safety level based at least in part on the occupant reaction measurement.

In another aspect of the present disclosure, performing the monitoring action further may include determining a weather condition using one or more of a plurality of vehicle sensors. The plurality of vehicle sensors includes at least one of: an exterior moisture sensor and a vehicle communication system. The weather condition includes one of: a precipitation weather condition and a non-precipitation weather condition. Performing the monitoring action further may include providing a notification to a vehicle owner in response to determining that the weather condition is the precipitation weather condition. Performing the monitoring action further may include waiting for a predetermined time period after providing the notification. Performing the monitoring action further may include closing a window of the vehicle in response to determining that the predetermined time period has elapsed. Performing the monitoring action further may include activating a heating, ventilation, and cooling (HVAC) system of the vehicle in response to determining that the predetermined time period has elapsed.

In another aspect of the present disclosure, performing the monitoring action further may include determining a traction battery state of charge (SOC) of a traction battery of the vehicle. Performing the monitoring action further may include comparing the traction battery SOC to a predetermined SOC threshold. Performing the monitoring action further may include providing a notification to a vehicle owner in response to determining that the traction battery SOC is less than or equal to the predetermined SOC threshold. Performing the monitoring action further may include waiting for a predetermined time period after providing the notification. Performing the monitoring action further may include performing a low-battery action in response to determining that the predetermined time period has elapsed. The low-battery action includes at least one of: deactivating a heating, ventilation, and cooling (HVAC) system of the vehicle, opening a window of the vehicle, and requesting emergency assistance.

In another aspect of the present disclosure, performing the corrective action further may include providing a notification to a vehicle owner. Performing the corrective action further may include waiting for a predetermined time period after providing the notification. Performing the corrective action further may include taking the corrective action in response to determining that the predetermined time period has elapsed. The corrective action includes at least one of: adjusting an operation of a heating, ventilation, and cooling (HVAC) system of the vehicle, opening a window of the vehicle, and requesting emergency assistance.

In another aspect of the present disclosure, the corrective action includes at least requesting emergency assistance. Requesting emergency assistance further may include displaying an informational message visible from an exterior of the vehicle using a vehicle exterior display. The informational message is based at least in part on the occupant comfort and safety level.

According to several aspects, a system for increasing occupant comfort and safety in a vehicle is provided. The system may include a plurality of vehicle sensors. The plurality of vehicle sensors includes a plurality of occupant monitoring sensors. The system further may include a controller in electrical communication with the plurality of vehicle sensors. The controller is programmed to detect an occupant in the vehicle using one or more of the plurality of occupant monitoring sensors. The controller is further programmed to determine an occupant comfort and safety level of the occupant in the vehicle using the one or more of the plurality of occupant monitoring sensors in response to detecting the occupant in the vehicle. The occupant comfort and safety level includes one of: a high comfort and safety level and a low comfort and safety level. The controller is further programmed to perform a monitoring action in response to determining that the occupant comfort and safety level is the high comfort and safety level. The controller is further programmed to perform a corrective action in response to determining that the occupant comfort and safety level is the low comfort and safety level.

In another aspect of the present disclosure, the plurality of occupant monitoring sensors further may include at least one of: a vehicle seat occupancy detection system and a vehicle interior camera. To detect the occupant in the vehicle, the controller is further programmed to perform a detection measurement using one or more of the plurality of occupant monitoring sensors. To detect the occupant in the vehicle, the controller is further programmed to identify the occupant in the vehicle based at least in part on the detection measurement.

In another aspect of the present disclosure, the plurality of occupant monitoring sensors further may include a vehicle interior temperature sensor and a biometric sensor. To determine the occupant comfort and safety level, the controller is further programmed to perform a vehicle interior temperature measurement using the vehicle interior temperature sensor. To determine the occupant comfort and safety level, the controller is further programmed to perform an occupant biometric measurement using the biometric sensor. To determine the occupant comfort and safety level, the controller is further programmed to determine the occupant comfort and safety level based at least in part on the vehicle interior temperature measurement and the occupant biometric measurement.

In another aspect of the present disclosure, the plurality of occupant monitoring sensors further may include at least one of: a vehicle interior microphone and a vehicle interior camera. To determine the occupant comfort and safety level, the controller is further programmed to perform an occupant reaction measurement using one or more of the plurality of occupant monitoring sensors. To determine the occupant comfort and safety level, the controller is further programmed to determine the occupant comfort and safety level based at least in part on the occupant reaction measurement.

In another aspect of the present disclosure, the system further may include a heating, ventilation, and cooling (HVAC) system in electrical communication with the controller. The plurality of vehicle sensors further may include a vehicle communication system. To perform the monitoring action, the controller is further programmed to determine a traction battery state of charge (SOC) of a traction battery of the vehicle. To perform the monitoring action, the controller is further programmed to compare the traction battery SOC to a predetermined SOC threshold. To perform the monitoring action, the controller is further programmed to provide a notification to a vehicle owner using the vehicle communication system in response to determining that the traction battery SOC is less than or equal to the predetermined SOC threshold. To perform the monitoring action, the controller is further programmed to wait for a predetermined time period after providing the notification. To perform the monitoring action, the controller is further programmed to perform a low-battery action in response to determining that the predetermined time period has elapsed. The low-battery action includes deactivating the HVAC system of the vehicle, opening a window of the vehicle, and requesting emergency assistance.

In another aspect of the present disclosure, to perform the corrective action, the controller is further programmed to provide a notification to a vehicle owner. To perform the corrective action, the controller is further programmed to wait for a predetermined time period after providing the notification. To perform the corrective action, the controller is further programmed to take the corrective action in response to determining that the predetermined time period has elapsed. The corrective action includes adjusting an operation of the HVAC system of the vehicle, opening the window of the vehicle, and requesting emergency assistance.

In another aspect of the present disclosure, the system further may include a vehicle exterior display in electrical communication with the controller. To request emergency assistance, the controller is further programmed to display an informational message visible from an exterior of the vehicle using the vehicle exterior display. The informational message is based at least in part on the occupant comfort and safety level.

According to several aspects, a method for increasing occupant comfort and safety in a vehicle is provided. The method may include determining a vehicle location of the vehicle using a global navigation satellite system (GNSS). The method further may include comparing the vehicle location to a list of previously visited locations. The method further may include initiating a detection routine in response to determining that the vehicle location is contained in the list of previously visited locations, the detection routine may include detecting an occupant in the vehicle using one or more of a plurality of occupant monitoring sensors. The method further may include performing a vehicle interior temperature measurement using one or more of the plurality of occupant monitoring sensors. The plurality of occupant monitoring sensors includes at least a vehicle interior temperature sensor. The method further may include performing an occupant biometric measurement using one or more of the plurality of occupant monitoring sensors. The plurality of occupant monitoring sensors further includes at least a biometric sensor. The method further may include performing an occupant reaction measurement using one or more of the plurality of occupant monitoring sensors. The plurality of occupant monitoring sensors further includes at least one of: a vehicle interior microphone and a vehicle interior camera determining an occupant comfort and safety level of the occupant in the vehicle based at least in part on the vehicle interior temperature measurement, the occupant biometric measurement, and the occupant reaction measurement. The occupant comfort and safety level includes one of: a high comfort and safety level and a low comfort and safety level. The method further may include performing a monitoring action in response to determining that the occupant comfort and safety level is the high comfort and safety level. The method further may include performing a corrective action in response to determining that the occupant comfort and safety level is the low comfort and safety level.

In another aspect of the present disclosure, performing the monitoring action further may include determining a traction battery state of charge (SOC) of a traction battery of the vehicle. Performing the monitoring action further may include comparing the traction battery SOC to a predetermined SOC threshold. Performing the monitoring action further may include providing a notification to a vehicle owner in response to determining that the traction battery SOC is less than or equal to the predetermined SOC threshold. Performing the monitoring action further may include waiting for a predetermined time period after providing the notification. Performing the monitoring action further may include performing a low-battery action in response to determining that the predetermined time period has elapsed. The low-battery action includes at least one of: deactivating a heating, ventilation, and cooling (HVAC) system of the vehicle, opening a window of the vehicle, and requesting emergency assistance.

In another aspect of the present disclosure, performing the corrective action further may include providing a notification to a vehicle owner. Performing the corrective action further may include waiting for a predetermined time period after providing the notification. Performing the corrective action further may include taking the corrective action in response to determining that the predetermined time period has elapsed. The corrective action includes at least one of: adjusting an operation of the HVAC system of the vehicle, opening the window of the vehicle, and requesting emergency assistance.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vulnerable and/or unattended occupants (e.g., children or pets) left in vehicles may be subject to uncomfortable and/or dangerous environmental conditions (e.g., temperature) occurring within the cabin of the vehicle. Therefore, the present disclosure provides a new and improved system and method for increasing occupant comfort and safety in a vehicle, including detection and monitoring of occupants and intervention to increase occupant comfort and safety.

Figure 1:
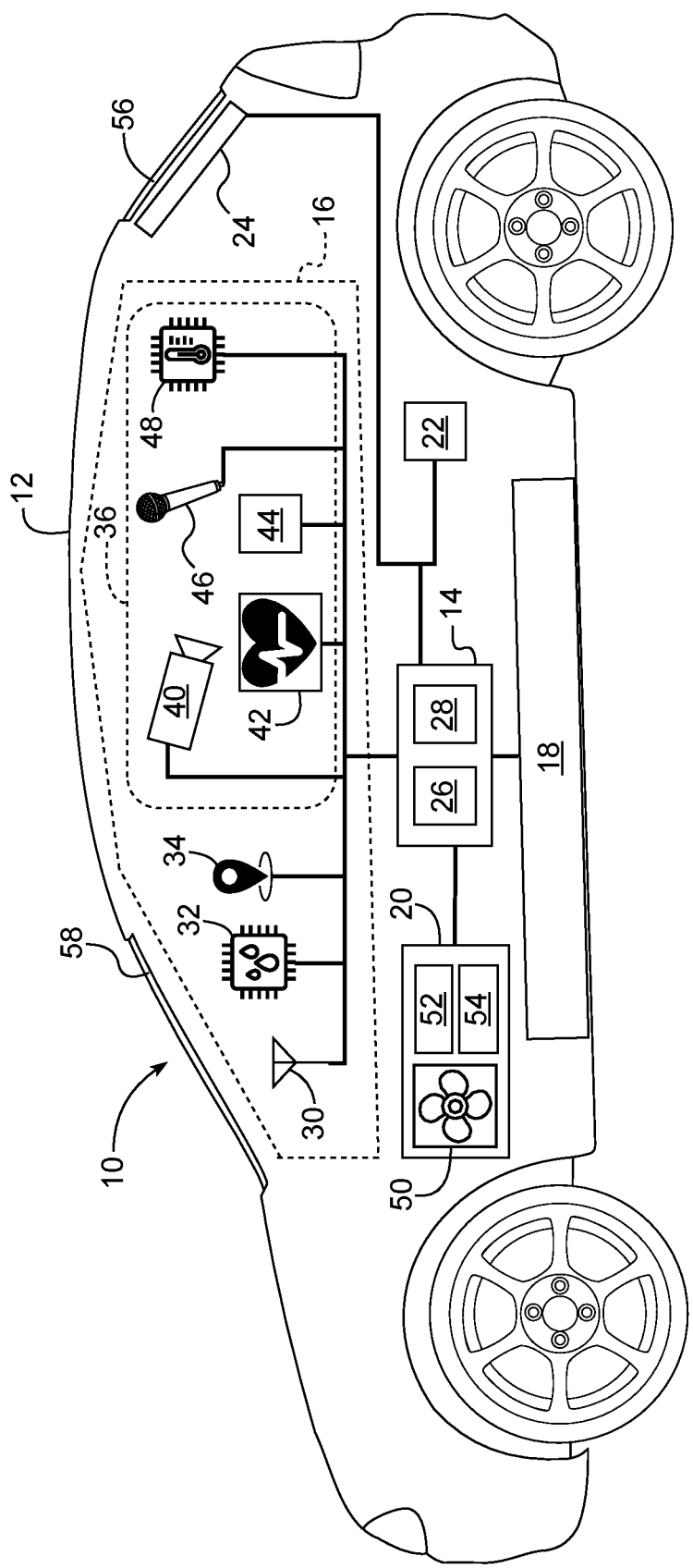
FIG. 1 is a schematic diagram of a system for increasing occupant comfort and safety in a vehicle, according to an exemplary embodiment.

Referring to FIG. 1, a system for increasing occupant comfort and safety in a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, a traction battery 18, a heating, ventilation, and air conditioning (HVAC) system 20, a plurality of window motors 22, and a vehicle exterior display 24.

The controller 14 is used to implement a method 100 for increasing occupant comfort and safety in a vehicle, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16, the traction battery 18, the HVAC system 20, the plurality of window motors 22, and the vehicle exterior display 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 16 are used to acquire information relevant to the vehicle 12. In an exemplary embodiment, the plurality of vehicle sensors 16 includes a vehicle communication system 30, an exterior moisture sensor 32, a global navigation satellite system (GNSS) 34, and a plurality of occupant monitoring sensors 36.

The vehicle communication system 30 is used by the controller 14 to communicate with other systems external to the vehicle 12. For example, the vehicle communication system 30 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 30 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 30 may further include an embedded universal integrated circuit card (eUICC) configured to store at least one cellular connectivity configuration profile, for example, an embedded subscriber identity module (eSIM) profile. The vehicle communication system 30 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 30 may include one or more antennas and/or communication transceivers for receiving and/or transmitting signals, such as cooperative sensing messages (CSMs). The vehicle communication system 30 is configured to wirelessly communicate information between the vehicle 12 and another vehicle. Further, the vehicle communication system 30 is configured to wirelessly communicate information between the vehicle 12 and infrastructure or other vehicles. It should be understood that the vehicle communication system 30 may be integrated with the controller 14 (e.g., on a same circuit board with the controller 14 or otherwise a part of the controller 14) without departing from the scope of the present disclosure.

The exterior moisture sensor 32 is used to detect the occurrence of precipitation (e.g., rain, hail, sleet, snow, etc.) on the vehicle 12. In an exemplary embodiment, the exterior moisture sensor 32 includes one or more moisture-sensitive elements disposed on an exterior surface of the vehicle 12. In a non-limiting example, the one or more moisture-sensitive elements utilize capacitive or resistive sensing principles to detect moisture. The controller 14 uses the exterior moisture sensor 32 to continuously monitor moisture levels on the exterior surface of the vehicle 12. The controller 14 may then identify the occurrence of precipitation based on the moisture levels. The exterior moisture sensor 32 is in electrical communication with the controller 14 as discussed above.

The GNSS 34 is used to determine a geographical location of the vehicle 12. In an exemplary embodiment, the GNSS 34 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 34 additionally includes a map. The map includes information about infrastructure such as municipality borders, roadways, railways, sidewalks, buildings, electric vehicle charging stations, gas stations, and the like. Therefore, the geographical location of the vehicle 12 is contextualized using the map information. In a non-limiting example, the map is retrieved from a remote source using a wireless connection. In another non-limiting example, the map is stored in a database of the GNSS 34. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 34 may be integrated with the controller 14 (e.g., on a same circuit board with the controller 14 or otherwise a part of the controller 14) without departing from the scope of the present disclosure. The GNSS 34 is in electrical communication with the controller 14 as discussed above.

The plurality of occupant monitoring sensors 36 are used to monitor a presence and status of one or more occupants of the vehicle 12. In the scope of the present disclosure, the occupant includes a driver, a passenger, a child, an infant, a pet, and/or any additional living beings in the vehicle 12. In an exemplary embodiment, the plurality of occupant monitoring sensors 36 includes a vehicle interior camera 40, a biometric sensor 42, a vehicle seat occupancy detection system 44, a vehicle interior microphone 46, and a vehicle interior temperature sensor 48. The plurality of occupant monitoring sensors 36 are in electrical communication with the controller 14 as discussed above.

The vehicle interior camera 40 is used to capture images and/or videos of the environment within the vehicle 12. In an exemplary embodiment, the vehicle interior camera 40 is a photo and/or video camera which is positioned to view the environment within a cabin of the vehicle 12. In one example, the vehicle interior camera 40 is affixed inside of the vehicle 12, for example, in a headliner of the vehicle 12, having a view towards one or more seats of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The vehicle interior camera 40 is in electrical communication with the controller 14 as discussed above.

The biometric sensor 42 is used to perform biometric measurements of the occupant. In the scope of the present disclosure, biometric measurements include, for example, respiration rate, heart rate, galvanic skin response, blood oxygen, body temperature, pupil dilation, brain activity, and/or the like. In an exemplary embodiment, the biometric sensor 42 includes a respiration rate sensor, a heart rate sensor, a galvanic skin response sensor, an electroencephalography (EEG) sensor, and/or the like. The biometric sensor 42 is in electrical communication with the controller 14, as discussed above.

In a non-limiting example, the respiration rate sensor is used to measure a respiration (i.e., breathing) rate of the occupant. In an exemplary embodiment, the respiration rate sensor is a pneumograph affixed to a chest or abdomen of the occupant. In another exemplary embodiment, the respiration rate sensor is a non-contact, infrared respiration rate sensor (e.g., an infrared or near infrared camera) affixed within the vehicle 12.

In a non-limiting example, the heart rate sensor is used to measure a heart rate of the occupant. In an exemplary embodiment, the heart rate sensor is an electrical sensor operable to detect a bio-electrical potential generated by electrical signals which control the expansion and contraction of heart chambers. In another exemplary embodiment, the heart rate sensor is an optical sensor (e.g., an infrared or near infrared camera) which uses light-based technology to measure a blood volume conveyed by the heart's pumping action. In a non-limiting example, the heart rate sensor is disposed within a seat, armrest, steering wheel, and/or other surface typically in contact with occupants within the vehicle 12.

In a non-limiting example, the galvanic skin response sensor is used to measure a skin conductivity of the occupant. In an exemplary embodiment, the galvanic skin response sensor is an electrical sensor operable to measure an electrical conductance between multiple electrodes in contact with the occupant's skin. In a non-limiting example, the galvanic skin response sensor is disposed within a seat, armrest, steering wheel, and/or other surface typically in contact with occupants within the vehicle 12.

In a non-limiting example, the EEG sensor is used to measure brain wave activity of the occupant. In a non-limiting example, the EEG sensor is disposed within a headrest of the vehicle 12.

The vehicle seat occupancy detection system 44 is used to detect a presence of an occupant in a seat of the vehicle 12. In an exemplary embodiment, the vehicle seat occupancy detection system 44 includes a pressure and/or weight sensor integrated into the seat of the vehicle 12. In a non-limiting example, the controller 14 uses the pressure and/or weight sensor to detect a pressure and/or weight distribution caused by an occupant sitting on the seat of the vehicle 12. The vehicle seat occupancy detection system 44 is in electrical communication with the controller 14, as discussed above.

The vehicle interior microphone 46 is used to receive sounds by converting acoustic waves into electrical signals. In an exemplary embodiment, the vehicle interior microphone 46 includes a unidirectional dynamic microphone (i.e., a microphone which converts acoustic waves to electrical signals using electromagnetic induction) configured to receive sounds emitted by a specific occupant of the vehicle 12. In another exemplary embodiment, the vehicle interior microphone 46 includes a plurality of microelectromechanical systems (MEMS) microphones (e.g., a microphone having a pressure-sensitive diaphragm etched directly into a silicon wafer) disposed throughout a cabin of the vehicle 12 configured to receive sounds. It should be understood that additional types of microphones which are configured to convert acoustic waves to electrical signals (e.g., digital and/or analog electrical signals) are included in the scope of the present disclosure. The vehicle interior microphone 46 is in electrical communication with the controller 14, as discussed above.

The vehicle interior temperature sensor 48 is used to determine and monitor an air temperature within the cabin of the vehicle 12. In an exemplary embodiment, the vehicle interior temperature sensor 48 is located within the vehicle 12, for example, near a dashboard or headliner of the vehicle 12. In a non-limiting example, the vehicle interior temperature sensor 48 includes a thermistor, thermocouple, and/or semiconductor-based temperature sensor. It should be understood that additional types of sensors which are configured to detect temperature are included in the scope of the present disclosure. The vehicle interior temperature sensor 48 is in electrical communication with the controller 14, as discussed above.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about an environment surrounding (i.e., outside of) the vehicle 12. In a non-limiting example, the plurality of vehicle sensors 16 further includes at least one of an ambient air temperature sensor, a barometric pressure sensor, a LIDAR sensor, an ultrasonic ranging sensor, a radar sensor, a time-of-flight sensor and/or a photo and/or video camera which is positioned to view the environment in front of the vehicle 12. The plurality of vehicle sensors 16 are in electrical communication with the controller 14 as discussed above.

The traction battery 18 stores and provides electrical energy in the form of direct current (DC) for propulsion of the vehicle 12. In an exemplary embodiment, the traction battery 18 includes a plurality of battery cells (e.g., lithiumion battery cells) electrically connected in series and/or parallel to provide an increased voltage and/or current-carrying capacity. In a non-limiting example, the plurality of battery cells are housed in an enclosure configured to protect the plurality of battery cells from mechanical vibration, water intrusion, and dust intrusion. The enclosure is also configured to provide temperature regulation (e.g., using a liquid cooling system, a resistive heating system, and/or the like). In an exemplary embodiment, the traction battery 18 further includes a battery management system (BMS) configured to monitor battery characteristics such as a state of charge (SOC), state of health (SOH), temperature, and/or the like, and transmit the battery characteristics to the controller 14. In a non-limiting example, the BMS includes a BMS controller in electrical communication with a plurality of BMS sensors disposed within the enclosure of the traction battery 18. In an exemplary embodiment, the traction battery 18 provides a DC voltage across a positive and negative output terminal. The traction battery 18 is in electrical communication with the controller 14 as discussed above.

The HVAC system 20 is used to control airflow within an interior of the vehicle 12. The HVAC system 20 is used to improve occupant comfort and safety by regulating temperature and humidity inside of the vehicle 12. In an exemplary embodiment, the HVAC system 20 includes a blower 50, air baffles 52, a temperature control 54, and HVAC outlets (not shown).

The blower 50 is an electrically driven fan which generates the airflow in the HVAC system 20. The air baffles 52 are electrically actuated surfaces within the HVAC system 20 which are used to direct the airflow within the HVAC system 20. By moving the air baffles 52, the HVAC system 20 may control a proportion of a total volume of the airflow generated by the blower 50 which is directed to each of the HVAC outlets. The temperature control 54 allows the HVAC system 20 to control a temperature of the airflow in the entire HVAC system 20. The HVAC outlets provide the airflow to the interior of the vehicle 12. In an exemplary embodiment, the HVAC outlets are configured to provide airflow to the occupants of the vehicle 12 to improve occupant comfort and safety.

The HVAC system 20 is in electrical communication with the controller 14 as described above. The blower 50, air baffles 52, and temperature control 54 of the HVAC system 20 may be controlled automatically by the controller 14, or in response to an input by an occupant of the vehicle 12 to a human-machine interface (not shown).

The plurality of window motors 22 are used to actuate a plurality of windows (not shown) of the vehicle 12. In an exemplary embodiment, one of the plurality of window motors 22 is integrated into each of a plurality of door assemblies of the vehicle 12 (e.g., a driver's door, front a passenger's door, a driver's side rear passenger door, and a passenger's side rear passenger door). In a non-limiting example, each of the plurality of window motors 22 is coupled to a window mechanism including a mechanical linkage and/or gear system which moves the one of the plurality of windows up and down along a window track.

The each of the plurality of window motors 22 functions by converting electrical energy into mechanical energy, which is used to move one of the plurality of windows. The occupant or the controller 14 activates one or more of the plurality of window motors 22 by sending electrical signals to the one or more of the plurality of window motors 22, causing it to rotate in one direction or the other, depending on whether the window is being opened or closed. The rotational motion is transmitted to the window mechanism, which translates the rotational motion into linear motion to raise or lower the window. The plurality of window motors 22 are in electrical communication with the controller 14 as described above.

The vehicle exterior display 24 is used to provide information to individuals outside of the vehicle 12. In an exemplary embodiment, the vehicle exterior display 24 is affixed to a rear windscreen 56 of the vehicle 12. In another exemplary embodiment, the vehicle exterior display 24 is affixed to a front windscreen 58 of the vehicle 12. In another exemplary embodiment, the vehicle exterior display 24 is affixed to one of the plurality of windows of the vehicle 12. In another exemplary embodiment, the vehicle exterior display 24 is mounted to an exterior surface of the vehicle 12, such as, for example, a body panel, a bumper, a roof rack, and/or the like. In a non-limiting example, the vehicle exterior display 24 is an electronic display such as, for example, a liquid-crystal display (LCD), a light-emitting diode (LED) display, a plasma display, an electroluminescent display, and/or the like. In another non-limiting example, the rear windscreen 56 includes transparent phosphors which are configured to emit light when selectively excited by a laser projector. It should be understood that the vehicle exterior display 24 may be used to display any message, graphic, image, icon and/or the like within the present disclosure. The vehicle exterior display 24 may additionally adjust a color, size, and/or location of the message within the scope of the present disclosure. The vehicle exterior display 24 is in electrical communication with the controller 14 as discussed above.

Figure 2:
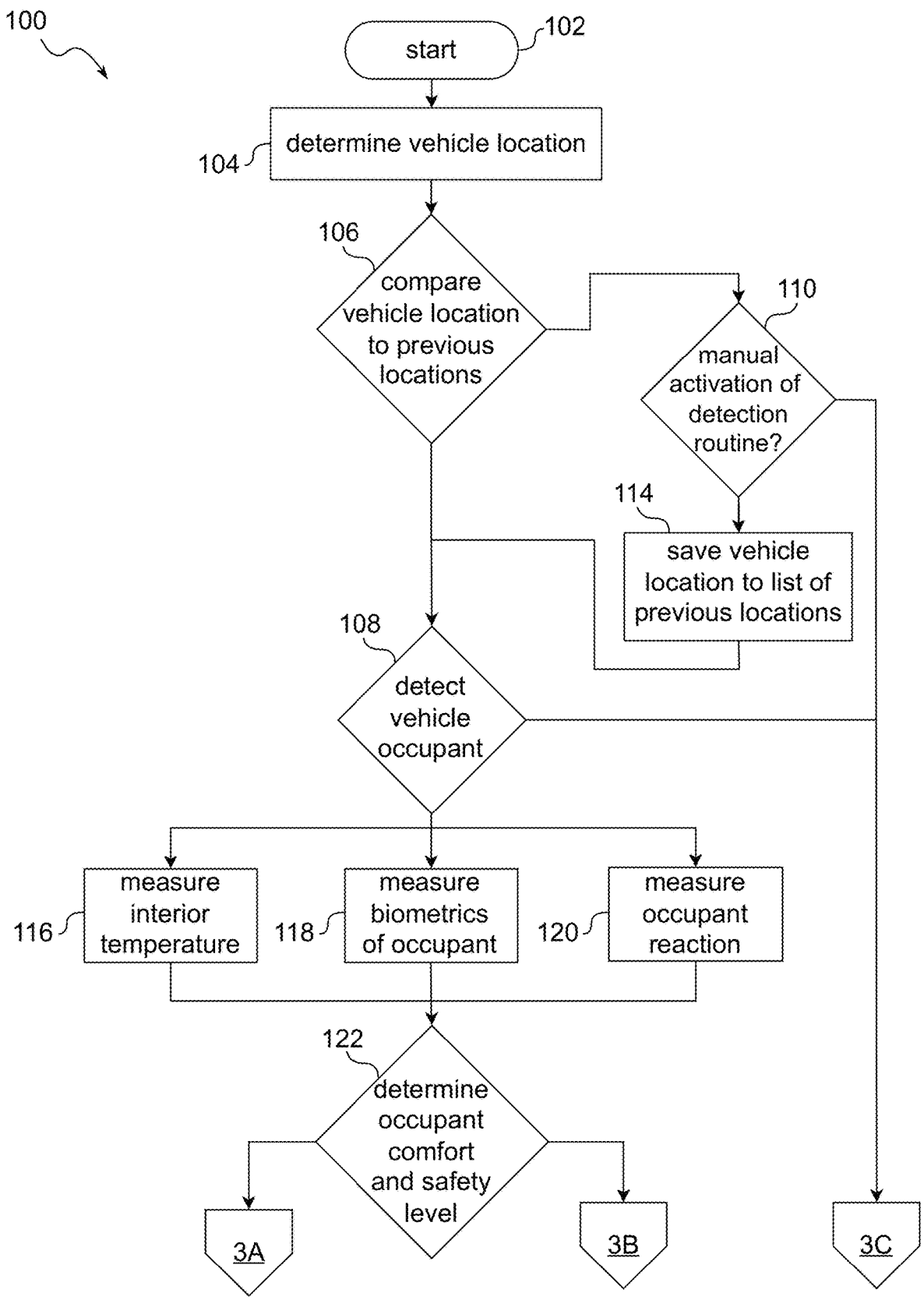
FIG. 2 is a flowchart of a method for increasing occupant comfort and safety in a vehicle, according to an exemplary embodiment.

Referring to FIG. 2, a flowchart of the method 100 for increasing occupant comfort and safety in a vehicle is shown. The method 100 begins at block 102 and proceeds to block 104. At block 104, the controller 14 uses the GNSS 34 to determine a vehicle location of the vehicle 12. After block 104, the method 100 proceeds to block 106.

At block 106, the controller 14 compares the vehicle location determined at block 104 to a list of previously visited locations. In an exemplary embodiment, the list of previously visited locations is stored in the media 28 of the controller 14. In the scope of the present disclosure, the list of previously visited locations is a list of locations where the occupant previously used the system 10. If the vehicle location determined at block 104 is in the list of previously visited locations, the method 100 proceeds to block 108 to initiate a detection routine, as will be discussed in greater detail below. If the vehicle location determined at block 104 is not in the list of previously visited locations, the method 100 proceeds to block 110.

At block 110, the controller 14 detects a manual activation of the detection routine. In an exemplary embodiment, the manual activation includes the occupant interacting with a physical button within the vehicle 12 and/or a virtual button of an infotainment system within the vehicle 12. If the manual activation is not detected, the method 100 proceeds to enter a standby state at block 112 (via off page reference 3C to FIG. 3). If the manual activation is detected, the method 100 proceeds to block 114.

At block 114, the controller 14 saves the vehicle location determined at block 104 to the list of previously visited locations in response to determining that the detection routine was manually activated. After block 114, the method 100 proceeds to block 108.

At block 108, the controller 14 uses one or more of the plurality of occupant monitoring sensors 36 to detect the occupant in the vehicle 12. As discussed above, in the scope of the present disclosure, the occupant includes a driver, a passenger, a child, an infant, a pet, and/or any additional living beings in the vehicle 12. In a non-limiting example, the system 10 and method 100 are used when the occupant has been left unattended in the vehicle 12.

In an exemplary embodiment, to detect the occupant, the controller 14 uses the vehicle seat occupancy detection system 44 to perform a detection measurement. In a non-limiting example, the detection measurement includes a pressure and/or weight distribution measurement of each of a plurality of seats of the vehicle 12. The controller 14 then analyzes the pressure and/or weight distribution measurement to identify the presence of one or more occupants within the vehicle 12.

In another exemplary embodiment, to detect the occupant, the controller 14 uses the vehicle interior camera 40 to perform the detection measurement. In a non-limiting example, the detection measurement includes one or more images or videos of the interior of the vehicle 12. The controller 14 uses a computer vision algorithm to analyze the one or more images or videos and identify the presence of one or more occupants within the vehicle 12.

In an exemplary embodiment, the computer vision algorithm utilizes machine learning techniques to analyze pixel-level information of an input image to detect and classify objects or patterns of interest. In a non-limiting example, the computer vision algorithm begins by preprocessing the input image through techniques such as, for example, image resizing, normalization, and/or filtering to reduce noise. Subsequently, the computer vision algorithm extracts relevant features from the input image using methods such as, for example, edge detection, corner detection, texture analysis, and/or the like. The computer vision algorithm may then utilize a machine learning model, such as, for example, a convolutional neural network (CNN), to classify and label relevant features (i.e., occupants) of the input image based on learned patterns and associations.

Figure 3:
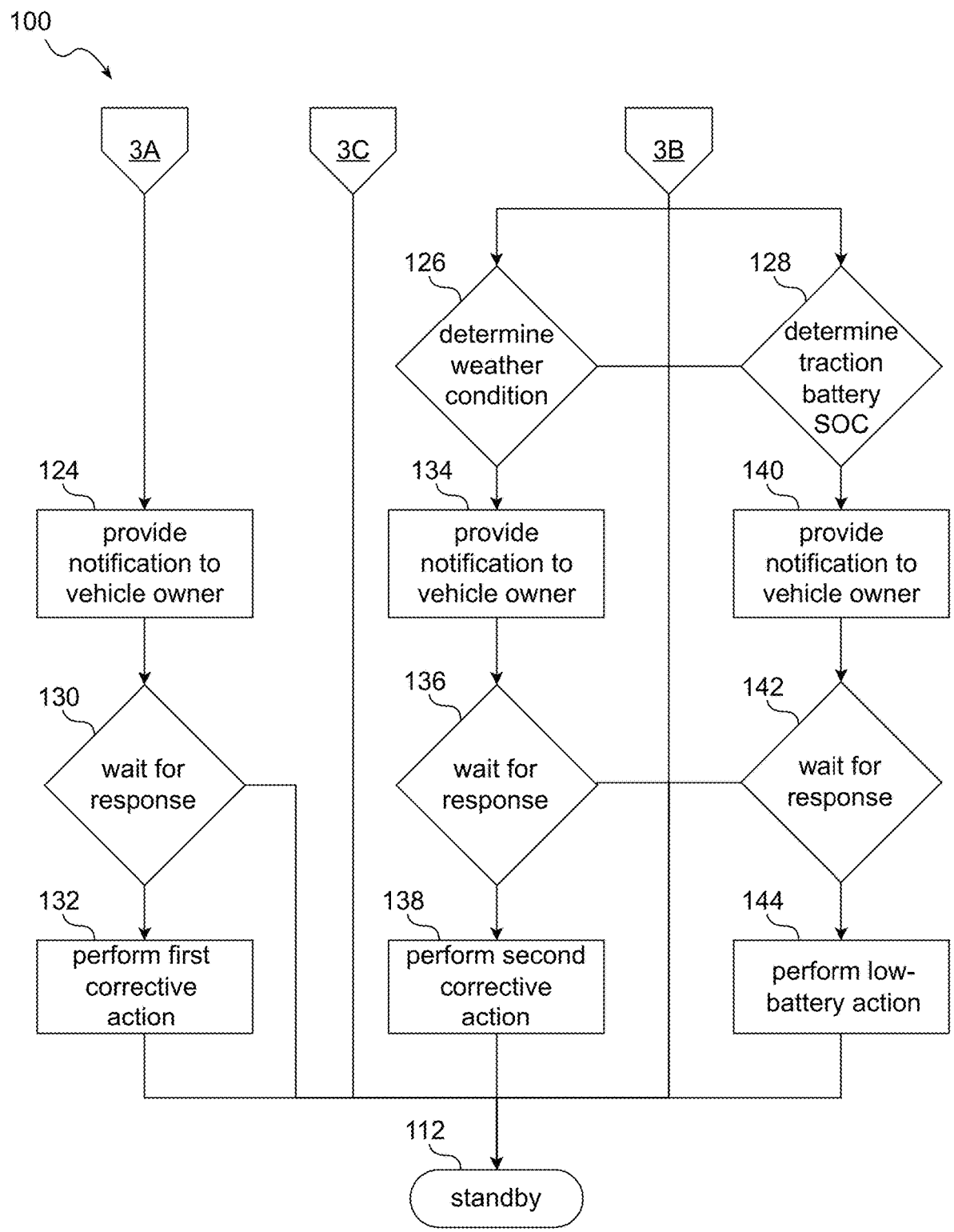
FIG. 3 is a continuation of the flowchart of FIG. 2 of the method for increasing occupant comfort and safety in a vehicle, according to an exemplary embodiment.

If no occupant is detected within the vehicle 12, the method 100 proceeds to enter the standby state at block 112 (via off page reference 3C to FIG. 3). If at least one occupant is detected within the vehicle 12, the method 100 proceeds to blocks 116, 118, and 120.

At block 116, the controller 14 uses the vehicle interior temperature sensor 48 to perform a vehicle interior temperature measurement. After block 116, the method 100 proceeds to block 122, as will be discussed in greater detail below.

At block 118, the controller 14 uses the biometric sensor 42 to perform an occupant biometric measurement of one or more occupants within the vehicle 12. In an exemplary embodiment, the occupant biometric measurement includes at least one of: respiration rate, heart rate, galvanic skin response, blood oxygen, body temperature, pupil dilation, and/or brain activity. After block 118, the method 100 proceeds to block 122, as will be discussed in greater detail below.

At block 120, the controller 14 uses the vehicle interior microphone 46 and the vehicle interior camera 40 to perform an occupant reaction measurement. In the scope of the present disclosure, the occupant reaction measurement is a measurement of the occupant's physical reaction, including, for example, sounds emitted by the occupant (e.g., words, screaming, crying, whining, barking, and/or the like) and body language of the occupant (e.g., excessive movement, lack of movement, movement indicating discomfort, and/or the like). In an exemplary embodiment, the occupant reaction measurement includes audio and/or photo/video recordings of the occupant. After block 120, the method 100 proceeds to block 122.

At block 122, the controller 14 determines an occupant comfort and safety level of the occupant in the vehicle 12. In the scope of the present disclosure, the occupant comfort and safety level indicates how comfortable and safe the occupant is within the vehicle 12 due to environmental conditions (e.g., temperature) within the vehicle 12. In an exemplary embodiment, the occupant comfort and safety level may include a high comfort and safety level and a low comfort and safety level. In the scope of the present disclosure, the high comfort and safety level indicates that the occupant is comfortable in the vehicle 12 and that the environmental conditions within the vehicle 12 do not present a health hazard to the occupant. The low comfort and safety level indicates that the occupant is not comfortable in the vehicle 12. In some cases, the low comfort and safety level may indicate that the environmental conditions within the vehicle 12 present a health hazard to the occupant. It should be understood that the occupant comfort and safety level may be expressed on a continuous scale (e.g., from zero to one hundred, where zero indicates very low comfort and safety level and one hundred indicates very high comfort and safety level), without departing from the scope of the present disclosure.

In an exemplary embodiment, the occupant comfort and safety level is determined based at least in part on the results of blocks 116, 118, and 120. In a non-limiting example, the controller 14 compares the vehicle interior temperature measurement performed at block 116 to a predetermined temperature threshold (e.g., thirty degrees Celsius). If the vehicle interior temperature measurement is less than or equal to the predetermined temperature threshold, the occupant comfort and safety level is determined to be the high comfort and safety level. If the vehicle interior temperature measurement is greater than the predetermined temperature threshold, the occupant comfort and safety level is determined to be the low comfort and safety level.

In another non-limiting example, the controller 14 analyzes the occupant biometric measurement performed at block 118 to determine the occupant comfort and safety level. In an exemplary embodiment, the controller 14 uses a rule-based algorithm to analyze the occupant biometric measurement. For example, if the heart rate of the occupant is greater than or equal to a predetermined heart rate threshold (e.g., one hundred and fifty beats per minute), the occupant comfort and safety level is determined to be the low comfort and safety level. In another exemplary embodiment, the controller 14 uses a biometric analysis machine learning algorithm to analyze the occupant biometric measurement.

In a non-limiting example, the biometric analysis machine learning algorithm includes multiple layers, including an input layer and an output layer, as well as one or more hidden layers. The input layer receives the occupant biometric measurement as an input. The input is then passed on to the hidden layers. Each hidden layer applies a transformation (e.g., a non-linear transformation) to the data and passes the result to the next hidden layer until the final hidden layer. The output layer produces the occupant comfort and safety level.

To train the biometric analysis machine learning algorithm, a dataset of inputs and their corresponding occupant comfort and safety level is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the biometric analysis machine learning algorithm, the algorithm is capable of accurately and precisely determining occupant comfort and safety level based on the occupant biometric measurement. By adjusting the weights between the nodes in each hidden layer during training, the algorithm "learns" to recognize patterns in occupant biometric measurements that are indicative of occupant comfort and safety level.

In another non-limiting example, the controller 14 analyzes the occupant reaction measurement performed at block 120 to determine the occupant comfort and safety level. In an exemplary embodiment, the controller 14 uses a rule-based algorithm to analyze the occupant reaction measurement. For example, if a volume of sounds emitted by the occupant is greater than or equal to a predetermined volume threshold (e.g., seventy decibels), the occupant comfort and safety level is determined to be the low comfort and safety level. In another exemplary embodiment, the controller 14 uses a reaction analysis machine learning algorithm to analyze the occupant reaction measurement.

In a non-limiting example, the reaction analysis machine learning algorithm includes multiple layers, including an input layer and an output layer, as well as one or more hidden layers. The input layer receives the occupant reaction measurement as an input. The input is then passed on to the hidden layers. Each hidden layer applies a transformation (e.g., a non-linear transformation) to the data and passes the result to the next hidden layer until the final hidden layer. The output layer produces the occupant comfort and safety level.

To train the reaction analysis machine learning algorithm, a dataset of inputs and their corresponding occupant comfort and safety level is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the reaction analysis machine learning algorithm, the algorithm is capable of accurately and precisely determining occupant comfort and safety level based on the occupant reaction measurement. By adjusting the weights between the nodes in each hidden layer during training, the algorithm "learns" to recognize patterns in occupant reaction measurements that are indicative of occupant comfort and safety level. The reaction analysis machine learning algorithm may also include techniques for image/video analysis such as, for example, edge detection, corner detection, texture analysis, and/or the like.

It should be understood that any combination of the aforementioned techniques for determining the occupant comfort and safety level based on any combination of one or more of the results of blocks 116, 118, and 120 is within the scope of the present disclosure. If the occupant comfort and safety level is determined to be the low comfort and safety level, the method 100 proceeds to block 124 (via off page reference 3A to FIG. 3). If the occupant comfort and safety level is determined to be the high comfort and safety level, the method 100 proceeds to blocks 126 and 128 (via off page reference 3B to FIG. 3).

Referring to FIG. 3, a continuation of the flowchart of FIG. 2 of the method 100 for increasing occupant comfort and safety in a vehicle is shown. At block 124, the controller 14 provides a notification to a vehicle owner. In the scope of the present disclosure, the vehicle owner is an individual who is responsible for the vehicle 12. In an exemplary embodiment, the controller 14 uses the vehicle communication system 30 to wirelessly transmit the notification to a mobile device (e.g., a smartphone, a tablet, a personal computer, and/or the like) of the vehicle owner. In a non-limiting example, the notification is provided via a push-notification from a mobile application running on the mobile device.

The notification includes information about the occupant comfort and safety level and the environmental conditions (e.g., temperature) inside and/or outside of the vehicle 12. The notification further includes capability for the vehicle owner to take action using the mobile device to improve the occupant comfort and safety level. Actions include, for example, commanding the controller 14 to operate one or more of the plurality of window motors 22 to open one or more windows of the vehicle 12, commanding the controller 14 to activate/deactivate and/or adjust a temperature setpoint of the HVAC system 20, or deactivating the system 10. Actions taken by the vehicle owner via the mobile device are transmitted to the vehicle communication system 30 for execution by the controller 14. After block 124, the method 100 proceeds to block 130.

At block 130, the controller 14 waits for a predetermined time period (e.g., three minutes) after sending the notification at block 124. During the predetermined time period, the controller 14 monitors the vehicle communication system 30 for any response by the vehicle owner via the mobile device. If the controller 14 does receive a response from the vehicle owner within the predetermined time period, the method proceeds to enter the standby state at block 112. If the controller 14 does not receive a response from the vehicle owner within the predetermined time period, the method proceeds to block 132.

At block 132, the controller 14 performs a first corrective action in response to determining that the predetermined time period has elapsed without a response from the vehicle owner. In an exemplary embodiment, the first corrective action includes one or more of: operating one or more of the plurality of window motors 22 to open/close one or more windows of the vehicle 12, activating/deactivating and/or adjusting the temperature setpoint of the HVAC system 20, and requesting emergency assistance.

In a non-limiting example, in the first corrective action, the temperature setpoint of the HVAC system 20 is adjusted to increase occupant comfort and safety. In an exemplary embodiment, the temperature setpoint is adjusted according to a look up table of known comfortable and safe temperatures. In another exemplary embodiment, the temperature setpoint is iteratively adjusted until the occupant comfort and safety level is improved (i.e., until the occupant comfort and safety level becomes the high comfort and safety level).

In another non-limiting example, in the first corrective action, if the vehicle interior temperature measurement is greater than or equal to a predetermined critical temperature threshold (e.g., thirty-eight degrees Celsius), the controller 14 requests emergency assistance. In an exemplary embodiment, to request emergency assistance, the controller 14 uses the vehicle communication system 30 to establish communication with local emergency services and/or a remote call center offering coordination of emergency services. In another exemplary embodiment, the controller 14 additionally uses the vehicle exterior display 24 to provide an informational message visible from outside of the vehicle 12. The informational message may include information about the occupant comfort and safety level and/or the environment within the vehicle 12, for example, "Interior temperature high-occupant in danger!". The informational message further may include animations, flashing lights, or other high-visibility characteristics to call attention to the vehicle 12 and assist emergency responders in locating the vehicle 12. After block 132, the method 100 proceeds to enter the standby state at block 112.

At block 126, the controller 14 determines a weather condition. In the scope of the present disclosure, the weather condition includes one of: a precipitation weather condition and a non-precipitation weather condition. In the scope of the present disclosure, the precipitation weather condition includes conditions such as, for example, rain, hail, sleet, snow, and/or the like. The non-precipitation weather condition includes dry conditions without precipitation. In an exemplary embodiment, the controller 14 uses the exterior moisture sensor 32 to determine the weather condition. In a non-limiting example, if moisture is detected by the exterior moisture sensor 32, the weather condition is determined to be the precipitation weather condition. If no moisture is detected by the exterior moisture sensor 32, the weather condition is determined to be the non-precipitation weather condition.

In another exemplary embodiment, the controller 14 uses the vehicle communication system 30 to wirelessly retrieve a weather report from a remote server based on the vehicle location determined at block 104. The controller 14 analyzes the weather report to determine whether the weather condition is the precipitation condition or the non-precipitation condition in the immediate geographical area surrounding the vehicle 12 at the present time. If the weather condition is the non-precipitation weather condition, the method 100 proceeds to enter the standby state at block 112. If the weather condition is the precipitation weather condition, the method 100 proceeds to block 134.

At block 134, the controller 14 provides a notification to the vehicle owner. In an exemplary embodiment, the controller 14 uses the vehicle communication system 30 to wirelessly transmit the notification to a mobile device (e.g., a smartphone, a tablet, a personal computer, and/or the like) of the vehicle owner. In a non-limiting example, the notification is provided via a push-notification from a mobile application running on the mobile device.

The notification includes information about the occupant comfort and safety level, the environmental conditions (e.g., temperature) inside the vehicle 12, and the weather condition determined at block 126. The notification further includes capability for the vehicle owner to take action using the mobile device. Actions include, for example, commanding the controller 14 to operate one or more of the plurality of window motors 22 to open/close one or more windows of the vehicle 12, commanding the controller 14 to activate/deactivate and/or adjust a temperature setpoint of the HVAC system 20, or deactivating the system 10. Actions taken by the vehicle owner via the mobile device are transmitted to the vehicle communication system 30 for execution by the controller 14. After block 134, the method 100 proceeds to block 136.

At block 136, the controller 14 waits for a predetermined time period (e.g., three minutes) after sending the notification at block 134. During the predetermined time period, the controller 14 monitors the vehicle communication system 30 for any response by the vehicle owner via the mobile device. If the controller 14 does receive a response from the vehicle owner within the predetermined time period, the method proceeds to enter the standby state at block 112. If the controller 14 does not receive a response from the vehicle owner within the predetermined time period, the method proceeds to block 138.

At block 138, the controller 14 performs a second corrective action in response to determining that the predetermined time period has elapsed without a response from the vehicle owner. In an exemplary embodiment, the second corrective action includes one or more of: operating one or more of the plurality of window motors 22 to open/close one or more windows of the vehicle 12, activating/deactivating and/or adjusting the temperature setpoint of the HVAC system 20.

In a non-limiting example, in the second corrective action, each of the plurality of window motors 22 are operated to close all windows of the vehicle 12 to prevent precipitation from entering the vehicle 12. The temperature setpoint of the HVAC system 20 is adjusted to maintain occupant comfort and safety despite reduced ventilation due to closure of the windows. In an exemplary embodiment, the temperature setpoint is adjusted to maintain the current temperature within the vehicle 12. In another exemplary embodiment, the temperature setpoint is adjusted according to a look up table of known comfortable and safe temperatures. After block 138, the method 100 proceeds to enter the standby state at block 112.

At block 128, the controller 14 determines a traction battery state of charge (SOC) of the traction battery 18. In an exemplary embodiment, to determine the traction battery SOC, the controller 14 communicates with the battery management system (BMS) of the traction battery 18, as discussed above. If the traction battery SOC is greater than a predetermined SOC threshold, the method 100 proceeds to enter the standby state at block 112. In a non-limiting example, the predetermined SOC threshold is a set value stored in the media 28 of the controller 14 (e.g., ten percent). In another non-limiting example, the predetermined SOC threshold is a minimum SOC required to drive the vehicle 12 to a nearest charging station, as determined using, for example, the vehicle location determined at block 104 and a map database of charging stations. If the traction battery SOC is greater than the predetermined SOC threshold, the method 100 proceeds enter the standby state at block 112. If the traction battery SOC is less than or equal to the predetermined SOC threshold, the method 100 proceeds to block 140.

At block 140, the controller 14 provides a notification to the vehicle owner. In an exemplary embodiment, the controller 14 uses the vehicle communication system 30 to wirelessly transmit the notification to a mobile device (e.g., a smartphone, a tablet, a personal computer, and/or the like) of the vehicle owner. In a non-limiting example, the notification is provided via a push-notification from a mobile application running on the mobile device.

The notification includes information about the occupant comfort and safety level, the environmental conditions (e.g., temperature) inside/outside the vehicle 12, and traction battery SOC determined at 128. The notification further includes capability for the vehicle owner to take action using the mobile device. Actions include, for example, commanding the controller 14 to operate one or more of the plurality of window motors 22 to open/close one or more windows of the vehicle 12, commanding the controller 14 to activate/deactivate and/or adjust a temperature setpoint of the HVAC system 20, or deactivating the system 10. Actions taken by the vehicle owner via the mobile device are transmitted to the vehicle communication system 30 for execution by the controller 14. After block 140, the method 100 proceeds to block 142.

At block 142, the controller 14 waits for a predetermined time period (e.g., three minutes) after sending the notification at block 140. During the predetermined time period, the controller 14 monitors the vehicle communication system 30 for any response by the vehicle owner via the mobile device. If the controller 14 does receive a response from the vehicle owner within the predetermined time period, the method proceeds to enter the standby state at block 112. If the controller 14 does not receive a response from the vehicle owner within the predetermined time period, the method proceeds to block 144.

At block 144, the controller 14 performs a low-battery action in response to determining that the predetermined time period has elapsed without a response from the vehicle owner. In an exemplary embodiment, the low-battery action includes one or more of: operating one or more of the plurality of window motors 22 to open/close one or more windows of the vehicle 12, activating/deactivating and/or adjusting the temperature setpoint of the HVAC system 20, and requesting emergency assistance.

In a non-limiting example, in the low-battery action, each of the plurality of window motors 22 are operated to open all windows of the vehicle 12 to increase airflow within the vehicle 12. The HVAC system 20 is deactivated to conserve battery power in the traction battery 18.

In another non-limiting example, in the low-battery action, the controller 14 requests emergency assistance. In an exemplary embodiment, to request emergency assistance, the controller 14 uses the vehicle communication system 30 to establish communication with local emergency services and/or a remote call center offering coordination of emergency services. In another exemplary embodiment, the controller 14 additionally uses the vehicle exterior display 24 to provide an informational message visible from outside of the vehicle 12. The informational message may include information about the occupant comfort and safety level and/or the environment within the vehicle 12, for example, "Vehicle battery low-occupant in danger!". The informational message further may include animations, flashing lights, or other high-visibility characteristics to call attention to the vehicle 12 and assist emergency responders in locating the vehicle 12. After block 144, the method 100 proceeds to enter the standby state at block 112.

In an exemplary embodiment, the controller 14 repeatedly exits the standby state 112 and restarts the method 100 at block 102. In a non-limiting example, the controller 14 exits the standby state 112 and restarts the method 100 on a timer, for example, every three hundred milliseconds to continuously monitor the vehicle 12 for occupants and determine occupant comfort and safety level.

The system 10 and method 100 of the present disclosure offer several advantages. The system 10 and method 100 may be activated manually by the vehicle owner or automatically based on vehicle location. Upon manual activation, vehicle location is recorded, and the system 10 and method 100 are automatically activated when the vehicle 12 returns to the same location. Using the system 10 and method 100, vulnerable and/or unattended occupants may be detected within the vehicle 12. Using the occupant monitoring sensors 36, the system 10 and method 100 allow for determination of occupant comfort and safety level. The system 10 and method 100 allow the vehicle owner to remotely take action to resolve issues related to occupant comfort and safety level, weather conditions, or battery state of charge depletion. If the vehicle owner does not respond, the system 10 and method 100 provide automated and proactive response to increase occupant comfort and safety.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for increasing occupant comfort and safety in a vehicle, the method comprising:
   determining a vehicle location of the vehicle using a global navigation satellite system (GNSS);
   comparing the vehicle location to a list of previously visited locations; and
   initiating a detection routine in response to determining that the vehicle location is contained in the list of previously visited locations, the detection routine comprising:
   detecting an occupant in the vehicle using one or more of a plurality of occupant monitoring sensors;
   determining an occupant comfort and safety level of the occupant in the vehicle using the one or more of the plurality of occupant monitoring sensors in response to detecting the occupant in the vehicle, wherein the occupant comfort and safety level includes one of: a high comfort and safety level and a low comfort and safety level;
   performing a monitoring action in response to determining that the occupant comfort and safety level is the high comfort and safety level; and
   performing a corrective action in response to determining that the occupant comfort and safety level is the low comfort and safety level.

2. The method of claim 1, further comprising:
   detecting a manual activation of the detection routine;
   determining the vehicle location using the GNSS in response to detecting the manual activation of the detection routine; and
   adding the vehicle location to the list of previously visited locations.

3. The method of claim 1, wherein detecting the occupant in the vehicle further comprises:
   performing a detection measurement using one or more of the plurality of occupant monitoring sensors, wherein the plurality of occupant monitoring sensors includes at least one of: a vehicle seat occupancy detection system and a vehicle interior camera; and
   identifying the occupant in the vehicle based at least in part on the detection measurement.

4. The method of claim 1, wherein determining the occupant comfort and safety level further comprises:
   performing a vehicle interior temperature measurement using one or more of the plurality of occupant monitoring sensors, wherein the plurality of occupant monitoring sensors includes at least a vehicle interior temperature sensor;
   comparing the vehicle interior temperature measurement to a predetermined temperature threshold;
   determining the occupant comfort and safety level to be the high comfort and safety level in response to determining that the vehicle interior temperature measurement is less than or equal to the predetermined temperature threshold; and
   determining the occupant comfort and safety level to be the low comfort and safety level in response to determining that the vehicle interior temperature measurement is greater than the predetermined temperature threshold.

5. The method of claim 4, wherein determining the occupant comfort and safety level further comprises:
    performing an occupant biometric measurement using one or more of the plurality of occupant monitoring sensors, wherein the plurality of occupant monitoring sensors further includes at least a biometric sensor; and
    determining the occupant comfort and safety level based at least in part on the occupant biometric measurement.

6. The method of claim 5, wherein determining the occupant comfort and safety level further comprises:
    performing an occupant reaction measurement using one or more of the plurality of occupant monitoring sensors, wherein the plurality of occupant monitoring sensors further includes at least one of: a vehicle interior microphone and a vehicle interior camera; and
    determining the occupant comfort and safety level based at least in part on the occupant reaction measurement.

7. The method of claim 1, wherein performing the monitoring action further comprises:
    determining a weather condition using one or more of a plurality of vehicle sensors, wherein the plurality of vehicle sensors includes at least one of: an exterior moisture sensor and a vehicle communication system, and wherein the weather condition includes one of: a precipitation weather condition and a non-precipitation weather condition;
    providing a notification to a vehicle owner in response to determining that the weather condition is the precipitation weather condition;
    waiting for a predetermined time period after providing the notification;
    closing a window of the vehicle in response to determining that the predetermined time period has elapsed; and
    activating a heating, ventilation, and cooling (HVAC) system of the vehicle in response to determining that the predetermined time period has elapsed.

8. The method of claim 1, wherein performing the monitoring action further comprises:
    determining a traction battery state of charge (SOC) of a traction battery of the vehicle;
    comparing the traction battery SOC to a predetermined SOC threshold;
    providing a notification to a vehicle owner in response to determining that the traction battery SOC is less than or equal to the predetermined SOC threshold;
    waiting for a predetermined time period after providing the notification; and
    performing a low-battery action in response to determining that the predetermined time period has elapsed, wherein the low-battery action includes at least one of: deactivating a heating, ventilation, and cooling (HVAC) system of the vehicle, opening a window of the vehicle, and requesting emergency assistance.

9. The method of claim 1, wherein performing the corrective action further comprises:
    providing a notification to a vehicle owner;
    waiting for a predetermined time period after providing the notification; and
    taking the corrective action in response to determining that the predetermined time period has elapsed, wherein the corrective action includes at least one of: adjusting an operation of a heating, ventilation, and cooling (HVAC) system of the vehicle, opening a window of the vehicle, and requesting emergency assistance.

10. The method of claim 9, wherein the corrective action includes at least requesting emergency assistance, and wherein requesting emergency assistance further comprises:
    displaying an informational message visible from an exterior of the vehicle using a vehicle exterior display, wherein the informational message is based at least in part on the occupant comfort and safety level.

11. A system for increasing occupant comfort and safety in a vehicle, the system comprising:
    a plurality of vehicle sensors, wherein the plurality of vehicle sensors includes a plurality of occupant monitoring sensors; and
    a controller in electrical communication with the plurality of vehicle sensors, wherein the controller is programmed to:
        detect an occupant in the vehicle using one or more of the plurality of occupant monitoring sensors;
        determine an occupant comfort and safety level of the occupant in the vehicle using the one or more of the plurality of occupant monitoring sensors in response to detecting the occupant in the vehicle, wherein the occupant comfort and safety level includes one of: a high comfort and safety level and a low comfort and safety level;
        perform a monitoring action in response to determining that the occupant comfort and safety level is the high comfort and safety level; and
        perform a corrective action in response to determining that the occupant comfort and safety level is the low comfort and safety level.

12. The system of claim 11, wherein the plurality of occupant monitoring sensors further comprises at least one of: a vehicle seat occupancy detection system and a vehicle interior camera, and wherein to detect the occupant in the vehicle, the controller is further programmed to:
    perform a detection measurement using one or more of the plurality of occupant monitoring sensors; and
    identify the occupant in the vehicle based at least in part on the detection measurement.

13. The system of claim 11, wherein the plurality of occupant monitoring sensors further comprises: a vehicle interior temperature sensor and a biometric sensor, and wherein to determine the occupant comfort and safety level, the controller is further programmed to:
    perform a vehicle interior temperature measurement using the vehicle interior temperature sensor;
    perform an occupant biometric measurement using the biometric sensor; and
    determine the occupant comfort and safety level based at least in part on the vehicle interior temperature measurement and the occupant biometric measurement.

14. The system of claim 13, wherein the plurality of occupant monitoring sensors further comprises at least one of: a vehicle interior microphone and a vehicle interior camera, and wherein to determine the occupant comfort and safety level, the controller is further programmed to:
    perform an occupant reaction measurement using one or more of the plurality of occupant monitoring sensors; and
    determine the occupant comfort and safety level based at least in part on the occupant reaction measurement.

15. The system of claim 11, wherein the system further comprises a heating, ventilation, and cooling (HVAC) system in electrical communication with the controller, wherein the plurality of vehicle sensors further comprises a vehicle communication system, and wherein to perform the monitoring action, the controller is further programmed to:
  determine a traction battery state of charge (SOC) of a traction battery of the vehicle;
  compare the traction battery SOC to a predetermined SOC threshold;
  provide a notification to a vehicle owner using the vehicle communication system in response to determining that the traction battery SOC is less than or equal to the predetermined SOC threshold;
  wait for a predetermined time period after providing the notification; and
  perform a low-battery action in response to determining that the predetermined time period has elapsed, wherein the low-battery action includes: deactivating the HVAC system of the vehicle, opening a window of the vehicle, and requesting emergency assistance.

16. The system of claim 15, wherein to perform the corrective action, the controller is further programmed to:
  provide a notification to a vehicle owner;
  wait for a predetermined time period after providing the notification; and
  take the corrective action in response to determining that the predetermined time period has elapsed, wherein the corrective action includes: adjusting an operation of the HVAC system of the vehicle, opening the window of the vehicle, and requesting emergency assistance.

17. The system of claim 16, wherein the system further comprises a vehicle exterior display in electrical communication with the controller, and wherein to request emergency assistance, the controller is further programmed to:
  display an informational message visible from an exterior of the vehicle using the vehicle exterior display, wherein the informational message is based at least in part on the occupant comfort and safety level.

18. A method for increasing occupant comfort and safety in a vehicle, the method comprising:
  determining a vehicle location of the vehicle using a global navigation satellite system (GNSS);
  comparing the vehicle location to a list of previously visited locations; and
  initiating a detection routine in response to determining that the vehicle location is contained in the list of previously visited locations, the detection routine comprising:
    detecting an occupant in the vehicle using one or more of a plurality of occupant monitoring sensors;
    performing a vehicle interior temperature measurement using one or more of the plurality of occupant monitoring sensors, wherein the plurality of occupant monitoring sensors includes at least a vehicle interior temperature sensor;
    performing an occupant biometric measurement using one or more of the plurality of occupant monitoring sensors, wherein the plurality of occupant monitoring sensors further includes at least a biometric sensor;
    performing an occupant reaction measurement using one or more of the plurality of occupant monitoring sensors, wherein the plurality of occupant monitoring sensors further includes at least one of: a vehicle interior microphone and a vehicle interior camera
    determining an occupant comfort and safety level of the occupant in the vehicle based at least in part on the vehicle interior temperature measurement, the occupant biometric measurement, and the occupant reaction measurement, wherein the occupant comfort and safety level includes one of: a high comfort and safety level and a low comfort and safety level;
    performing a monitoring action in response to determining that the occupant comfort and safety level is the high comfort and safety level; and
    performing a corrective action in response to determining that the occupant comfort and safety level is the low comfort and safety level.

19. The method of claim 18, wherein performing the monitoring action further comprises:
  determining a traction battery state of charge (SOC) of a traction battery of the vehicle;
  comparing the traction battery SOC to a predetermined SOC threshold;
  providing a notification to a vehicle owner in response to determining that the traction battery SOC is less than or equal to the predetermined SOC threshold;
  waiting for a predetermined time period after providing the notification; and
  performing a low-battery action in response to determining that the predetermined time period has elapsed, wherein the low-battery action includes at least one of: deactivating a heating, ventilation, and cooling (HVAC) system of the vehicle, opening a window of the vehicle, and requesting emergency assistance.

20. The method of claim 19, wherein performing the corrective action further comprises:
  providing a notification to a vehicle owner;
  waiting for a predetermined time period after providing the notification; and
  taking the corrective action in response to determining that the predetermined time period has elapsed, wherein the corrective action includes at least one of: adjusting an operation of the HVAC system of the vehicle, opening the window of the vehicle, and requesting emergency assistance.

* * * * *